United States Patent [19]
Holland

[11] Patent Number: 5,330,623
[45] Date of Patent: * Jul. 19, 1994

[54] PROCESS OF DESTRUCTIVE DISTILLATION OF ORGANIC MATERIAL

[76] Inventor: Kenneth M. Holland, Ashwood, Wynwoods, CampbellClose, Romford, United Kingdom

[*] Notice: The portion of the term of this patent subsequent to Jan. 28, 2009 has been disclaimed.

[21] Appl. No.: 826,126

[22] Filed: Jan. 27, 1992

Related U.S. Application Data

[63] Continuation-in-part of Ser. No. 474,066, May 11, 1990, Pat. No. 5,084,141.

[51] Int. Cl.$^5$ ............................................. C10B 53/00
[52] U.S. Cl. .................................... 201/19; 201/25; 201/29; 201/32; 201/35; 423/449.1; 585/241
[58] Field of Search ..................... 201/19, 25, 29, 32, 201/35; 585/241; 423/449

[56] References Cited

U.S. PATENT DOCUMENTS

| | | | |
|---|---|---|---|
| 3,449,213 | 6/1969 | Knapp et al. | 201/19 |
| 3,843,457 | 10/1974 | Grannen et al. | 201/19 |
| 4,118,282 | 10/1978 | Wallace | 201/25 |
| 4,376,034 | 3/1983 | Wall | 201/19 |
| 4,647,443 | 3/1987 | Apffel | 585/241 |

Primary Examiner—Joye L. Woodard
Attorney, Agent, or Firm—Rodman & Rodman

[57] ABSTRACT

The organic material (such as waste tire compound) is pyrolysed by pre-heating the organic material (without pyrolysis) in a preheat zone 9 by a hot gas stream; feeding pre-heated material directly to a microwave discharge zone 10 by means of conveyor 8; pyrolysing the pre-heated material in the microwave discharge zone to produce solid fission products containing elemental carbon and gaseous by-products; and recycling at least some of the latter to the hot gas stream which is supplied to the pre-heating zone.

14 Claims, 2 Drawing Sheets

PROCESS OF DESTRUCTIVE DISTILLATION OF ORGANIC MATERIAL

CROSS-REFERENCE TO RELATED APPLICATIONS

The present application is a continuation-in-part application of Ser. No. 07/474066 filed May 11, 1990, now U.S. Pat. No. 5,084,141.

The present invention is concerned with the destructive distillation (or pyrolysis) of organic material, and particularly (but not exclusively), the pyrolysis of waste tire material or other similar rubber compounds.

DESCRIPTION OF THE PRIOR ART

A process of pyrolysing organic waste by means of microwaves is disclosed in U.S. Pat. No. 3,843,457; in this process organic industrial and household wastes are comminuted and the comminuted solid material is subjected to a microwave discharge in a gas stream at a pressure substantially less than atmospheric for a contact time of the order of one second. The gas stream and the comminuted solid material pass through the microwave zone in parallel, with a view to maximising interaction between the gas and the solid.

Microwave destruction of waste tire material has also been disclosed in, for example, (examined) Japanese Patent Applications 76/47192-3, 77/26553, 82/3491 and (unexamined) Japanese Patent Applications 52/3672 and 51/123287. These documents describe laboratory scale processes, in which small quantities of the waste rubber are subjected to microwave discharge so as to completely break the rubber down and produce carbon black and hydrocarbons (gaseous or liquid). These documents give no details as to how the basic idea of microwave pyrolysis could be converted into a commercial process.

A more recent document, U.S. Pat. No. 4,647,443, discloses a process of pyrolyzing of waste tire material which involves subjecting the tire material to radiant heating so as to produce a pyrolyzed char, and then subjecting the char to microwave discharge to remove volatile hydrocarbons from the char, so as to produce carbon black.

The disadvantage of this process is that radiant heating of tire material involves relatively inefficient heat transfer. I have found that, contrary to the teaching of U.S. Pat. No. 4,647,443, it is advantageous to pre-heat tire material (and other organic materials), without pyrolysis thereof, prior to complete pyrolysis by means of microwaves. That is, microwave-induced pyrolysis has been found to be impaired if tire material (or other organic material) has previously been partly pyrolyzed (this is postulated to be because of the insulating effect of the elemental carbon produced on pyrolysis). It is believed that this may be why the U.S. patent teaches that the pyrolysis should be taken to substantial completion in the radiant heating stage.

I have now found that, in contradistinction to the teaching of U.S. Pat. No. 4,647,443, it is advantageous to completely avoid pyrolysis in a pre-heating stage prior to microwave-induced pyrolysis.

SUMMARY OF THE INVENTION

The process according to the invention enables microwave pyrolysis of waste tire material and other rubber compounds, as well as other organic materials, to be operated as a commercial destructive distillation process.

The process according to the invention comprises the steps of:
(a) pre-heating waste organic material containing a substantial proportion of carbon-carbon bonds, at superatmospheric pressure and a temperature of at least about 60° C. in a pre-heating zone, substantially without pyrolysis of said organic material to elemental carbon, by means of a hot gas stream;
(b) feeding said pre-heated material by movable feed means directly from said pre-heating zone to a microwave discharge zone having an atmosphere comprising a substantially oxygen-free gas at superatmospheric pressure;
(c) pyrolyzing said pre-heated material in said zone by means of a microwave discharge in the low gigahertz frequency range for about 15 to 60 minutes, to cause fission of substantially all the carbon-carbon bonds in said organic material, in addition to fission of more polar chemical bonds, to produce solid fission products containing elemental carbon, and gaseous by-products;
(d) collecting said solid fission products downstream of said microwave discharge zone; and
(e) recycling at least part of said gaseous by-products to said hot gas stream to effect said pre-heating.

The process according to the invention can be operated as a continuous process, as will be explained hereinafter.

It should, perhaps, be mentioned that a process involving the continuous microwave treatment of waste rubber material is known; see, for example, U.S. Pat. No. 4,104,205 and 4,129,768, which are both concerned with devulcanization of the rubber (that is, fission of carbon-sulphur bonds, but not of carbon-carbon bonds in the molecular structure). U.S. Pat. Nos. 2,028,835 and 1,513,656 are similarly concerned with devulcanization of rubber compounds by means of microwave irradiation. There is no hint or suggestion in any of these documents of the use of the conditions employed in the process according to the present invention for the purpose of substantial breakdown of carbon-carbon bonds.

DESCRIPTION OF THE PREFERRED EMBODIMENTS

Figure 1:
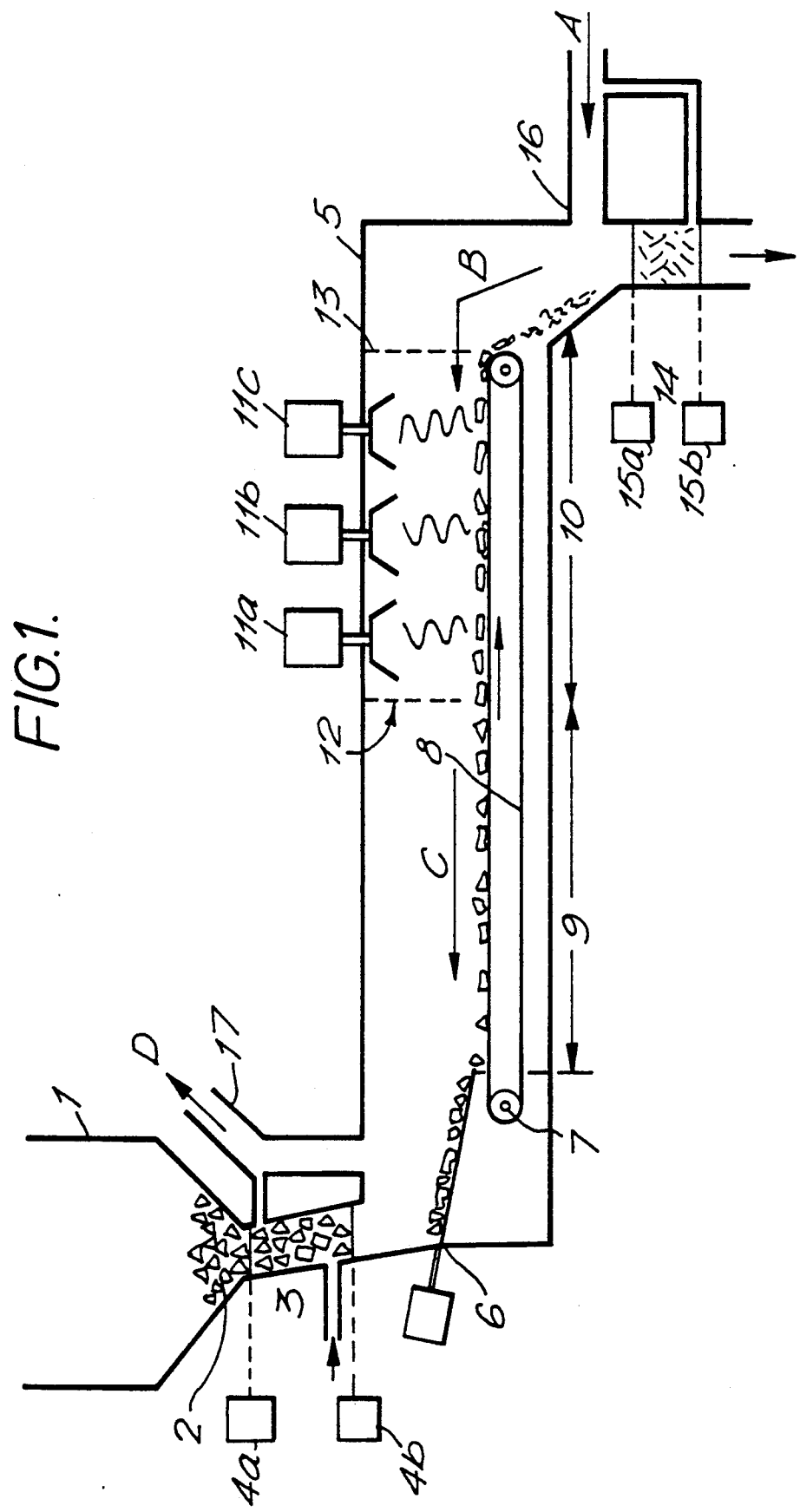
FIG. 1 is a schematic illustration of an exemplary embodiment of the pyrolysis process according to the invention.

In one embodiment of the invention, it is preferred that gaseous by-products should be recycled to function as the above-mentioned gas stream; it is also preferred that products in the nature of oils or other liquids should be collected, and where appropriate, used as fuels to provide at least some of the energy input into the process.

The process according to the invention is directly contrary to the process described in U.S. Pat. No. 3,843,457, in which it is suggested that in order to recover valuable products from solid waste which contains organic materials, one should subject the waste to microwave discharge while at reduced pressure and at less than 200° C.; this appears to be because the waste material envisaged by the patentee comprises carbohydrates of which molecular fragments are reacted with an ionised gas, ionisation being caused by the microwave discharge.

In the process according to the invention, the material being subjected to destructive distillation is such that it contains a substantially proportion of carbon-carbon bonds (such as a hydrocarbon or carbohydrate material). Examples of such materials include natural or synthetic rubber compounds, and agricultural waste material such as citrus fruit peel, olive waste products, and nut shell (e.g. coconut shell), and animal waste (such as sewage slurry or the like). The organic material is generally such that the solid fission products produced predominantly comprise elemental carbon.

In some embodiments (and particularly where the material being pyrolyzed is a rubber compound), it is preferred that the organic material subjected to microwave discharge in the process according to the invention should contain carbon filler; a particularly preferred such material is waste tire compound. Waste tire compound pyrloyzed according to the present invention may be in bulk or finely divided form (e.g. chopped form or pulverulent form). Such a material may contain, in addition to carbon filler, organic textile reinforcement and/or metal wire (e.g. steel wire) reinforcement.

When an organic textile material is employed, the latter is generally substantially carbonized in the discharge zone; when metal wire reinforcement is employed, the latter wire is substantially unaffected by the microwave discharge and is therefore collected together with the solid fission products.

In the process according to the present invention, the waste material is pre-heated by means of the gas stream before being subject to the microwave discharge. The temperature to which the bulk of the pre-heated material is raised is difficult to determine with accuracy, but should be at least 60° C. It is preferred that at least the surface regions of particles of the pre-heated material should attain a temperature of at least 250° C. (such as 300° to 500° C.). It is particularly preferred that both the pre-heating stage and the microwave discharge stage should be carried out in a vessel (which is preferably thermally insulated and of suitable pressure rating) through which the organic material is passed on a conveyor or other movable feed means in a continuous manner.

Typically, the same conveyor is used to forward the organic material through the pre-heating zone, to feed the pre-heated material to said microwave discharge zone, and to forward the pre-heated material through the microwave discharge zone. Such a conveyor may be, for example, an endless belt comprising stainless steel or the like.

Generally, it is preferred that the pre-heating zone and the microwave zone each have purge locks both for supply of the organic material and for removal of solid fission products therefrom so as to substantially prevent inflow of oxygen-containing gas into the respective zone.

The gas stream used in the process according to the invention (which may be supplied in a countercurrent relative to the feed of organic material through the microwave discharge zone, or fed in the same direction) may additionally contain a separately supplied hydrocarbon or inert gas such as nitrogen, as well as at least some of the gaseous products of the destructive distillation. When the gas stream is fed in the same direction this may help to avoid problems with condensation in the microwave discharge zone (preferably after scrubbing of the gas); in some embodiments (for example, where it is desirable to minimise microwave power input) the gas stream is fed at a temperature of at least 250° C. (such as 300° to 500° C.) when entering the pre-heating zone (or, where appropriate, microwave discharge zone).

The microwave discharge used in the process according to the invention may be in the low gigahertz frequency range (e.g. about 2.4 gigahertz or about 0.91 gigahertz). The duration of the microwave irradiation phase is typically about 15 to 60 minutes; this will depend largely on the nature of the material to be pyrolyzed.

Referring to FIG. 1, there is shown a feed hopper 1 which is charged with chopped waste rubber compound 2. Towards the base of hopper 1 is a purge lock 3 comprising an upper gate 4a and a lower gate 4b, which can be operated so as to prevent, or at least minimise, inflow of air when the rubber compound is charged to an insulated vessel 5.

As rubber compound is charged from the hopper 1, it falls into a vibrating feed and spreader 6, which itself causes the chopped material to be forwarded to the drive end 7 of a belt-type conveyor 8 where the material is preferably spread as a bed of a predetermined depth. As illustrated, the drive end of the conveyor is located in a pre-heating zone 9 of the vessel 5. In the pre-heating zone, the chopped material is typically heated such that at least the surface thereof attains a temperature in the range 300° to 500° C.

Downstream of the pre-heating zone 9 is a microwave discharge zone 10 having a plurality of microwave sources 11a, 11b, 11c. These sources may be all of substantially similar power output, or, alternatively, of graduated power output (for example, of gradually increasing power output with distance from the pre-heating zone 9). The microwave zone 10 is separated from the pre-heating zone 9 by a microwave shield 12; there is a further such shield 13 downstream of the conveyor 8. Further downstream still is a second purge lock 14 comprising an upper gate 15a and a lower gate 15b; solids from the downstream end of the conveyor 8 pass directly to the second purge lock, from where solids produced may be collected.

The vessel 5 is further provided with a gas inlet 16 for hot circulating gas, which passes in the direction of arrows A, B, C, D, and a gas outlet 17 for the gas. The gas supply is controlled such that the gas pressure in the vessel is superatmospheric. In the illustrated embodiment of FIG. 1, the inlet 16 and the outlet 17 are so arranged that the gas flows in countercurrent through the microwave discharge zone 10 and then through the pre-heating zone 9.

Figure 2:
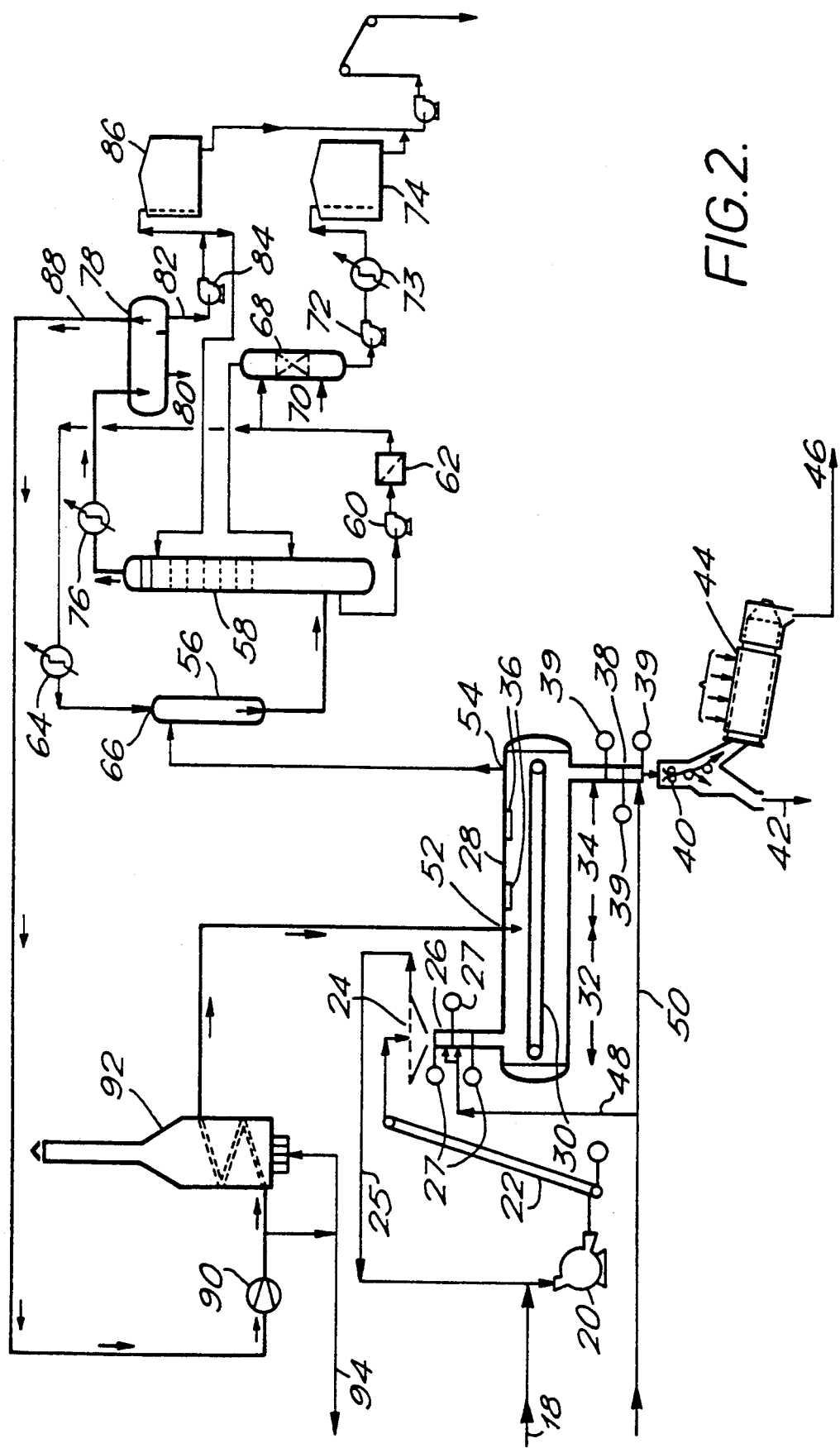
FIG. 2 is a more detailed flow diagram of a further embodiment of the process according to the invention.

Referring to FIG. 2, there is shown a process in which waste tire compound 18 is fed to a shredder 20 and the shredded material passed by a feed conveyor 22 to a hopper 24 (oversized material being recycled via line 25 to shredder 20) and then via purge chamber 26 having a series of three purge lock gates 27 to a reactor 28 having a heat resistant conveyor 30 passing therethrough. The conveyor 30 extends from a first upstream end 32 of the reactor 28, which functions as a pre-heating zone, to a second, downstream end 34 provided with microwave sources 36, in which the shredded tire compound is pyrolyzed to fission products containing elemental carbon.

The fission products pass from the downstream end 34 of the reactor 28, through a further purge chamber 38 having a series of three purge lock gates 39, via crush rolls 40 to a magnetic separation zone 40, from which steel scrap is collected at outlet 42; the remaining pyrolyzed material is passed through a cooling zone 44 to be collected downstream at 46.

Nitrogen is fed via lines 48 and 50 to each of the purge chambers 26 and 38 so as to ensure that there is an oxygen-free atmosphere, at superatmospheric pressure, in the reactor 28.

The reactor 28 is further provided with a gas circulation circuit, in which gas is introduced via inlet 52 upstream of the downstream end 34 of the reactor, and allowed to exit via outlet 54 downstream of the microwave zone. From outlet 54, the gas passes to a quench cooler 56 and thence to a quench column 58.

Bottoms from the latter are recycled via recirculating oil pump 60, filter 62, and oil cooler 64 to the top 66 of quench cooler 56, part of the stream from the filter 62 being passed to stripper 68 supplied with steam 70. Bottoms from the stripper 68 are passed via oil pump 72 and heat exchanger 73 to storage tank 74; volatiles from the stripper 68 are recycled to quench column 58. Volatiles from column 58 are passed via heat exchanger 76 to decanter 78, where separation is effected into effluent 80 (for disposal), liquids 82 (passed via pump 84 to storage tank 86 for mixing with oil from tank 74) and gases 88. A portion of the gas is recycled via blower 90 and gas heater 92 to inlet 52; the remainder of the gas is drawn off at 94 to be used for power generation or the like.

In a variation of the arrangement shown in FIG. 2, the gas inlet 52 may be further upstream, for example, in the pre-heating zone 32 or even to purge chamber 26. In this latter embodiment, the recycled part of the gaseous by-products is passed through the pre-heating zone and the microwave discharge zone, in that order.

I claim:

1. A process of destructive distillation of waste organic material containing a substantial proportion of carbon-carbon bonds, which comprises the steps of:
   (a) pre-heating the bulk of said waste organic material to a temperature of at least about 60° C. at superatmospheric pressure in a pre-heating zone, substantially without pyrolysis of said organic material to elemental carbon, by means of a hot gas stream;
   (b) feeding said pre-heated material by movable feed means directly from said pre-heating zone to a microwave discharge zone having an atmosphere comprising a substantially oxygen-free gas at superatmospheric pressure;
   (c) pyrolyzing said pre-heated material in said zone by means of a microwave discharge in the low gigahertz frequency range for about 15 to 60 minutes, to cause fission of substantially all the carbon-carbon bonds in said organic material in addition to fission of more polar chemical bonds, to produce solid fission products of elemental carbon, and gaseous by-products;
   (d) collecting said solid fission products downstream of said microwave discharge zone; and
   (e) recycling at least part of said gaseous by-products to said hot gas stream to effect said pre-heating.

2. A process according to claim 1, wherein the feed means is used to forward said organic material through the pre-heating zone, to feed said pre-heated material to said microwave discharge zone, and to forward said material through said microwave discharge zone.

3. A process according to claim 1, wherein a first purge lock is provided for the supply of organic material to said pre-heating zone and a second purge lock is provided for removal of said material from said microwave discharge zone, said purge locks operating to substantially prevent inflow of oxygen-containing gas into each of said zones.

4. A process according to claim 1, wherein said hot gas stream further comprises separately supplied hydrocarbon or nitrogen.

5. A process according to claim 1, wherein liquid or gaseous by-products from the microwave discharge zone are burnt and the resultant thermal energy is used to provide part of the total energy put into the process.

6. A process according to claim 1, in which said organic material is predominantly selected from the group consisting of hydrocarbon materials, carbohydrate materials and mixtures thereof.

7. A process according to claim 1, wherein said organic material comprises a rubber compound.

8. A process according to claim 7, wherein said rubber compound contains carbon filler.

9. A process according to claim 1, wherein the microwave discharge zone is separated from the pre-heating zone.

10. A process according to claim 1, wherein the separation is accomplished by using a microwave shield.

11. A process according to claim 1, wherein the microwave discharge is about 2.4 gigahertz.

12. A process according to claim 1, wherein said organic material comprises waste material selected from the group consisting of natural or synthetic rubber compounds, agricultural waste material, animal waste materials and mixtures thereof.

13. A process according to claim 1, wherein the hot gas stream comprising the recycled part of the gaseous byproducts is passed through the pre-heating zone and the microwave discharge zone, in that order.

14. A process according to claim 1, wherein said hot gas stream is at a temperature of at least 250° C. when entering the pre-heating zone.

* * * * *